United States Patent [19]

Pacheco

[11] E Re. 28,547

[45] Reissued Sept. 9, 1975

[54] GAS-OPERATED INTERNAL COMBUSTION ENGINE

[75] Inventor: Francisco Pacheco, Hewitt, N.J.

[73] Assignees: Michael Ebert; E. J. Kalil; A. Rosen; P. Clark; C. J. Girone, ; a part interest to each

[22] Filed: Oct. 24, 1973

[21] Appl. No.: 409,259

Related U.S. Patent Documents

Reissue of:

[64] Patent No.: 3,648,668
Issued: Mar. 14, 1972
Appl. No.: 53,112
Filed: July 8, 1970

[52] U.S. Cl. ..... 123/3; 123/1 A; 123/119 E; 123/DIG. 12; 136/100 R; 136/140; 290/1

[51] Int. Cl. ..... F02b 43/00; H01m 17/02

[58] Field of Search ..... 136/100 M, 100 R, 140; 123/119 E, DIG. 12, 1, 1 A, 3; 290/1

[56] References Cited

UNITED STATES PATENTS

| | | | |
|---|---|---|---|
| 390,675 | 10/1888 | Humphreys | 136/140 |
| 583,104 | 5/1897 | Wattles | 123/119 E |
| 2,530,751 | 11/1950 | Anderson et al. | 136/100 M |
| 2,781,413 | 2/1957 | Luening | 136/100 M |
| 2,925,455 | 2/1960 | Eidensohn et al. | 136/100 R |
| 3,036,141 | 5/1962 | Goldenberg et al. | 136/100 M |
| 3,218,195 | 11/1965 | Corren | 136/100 M |
| 3,247,024 | 4/1966 | Tamminen | 136/140 |
| 3,256,504 | 6/1966 | Fidelman | 136/100 M X |

OTHER PUBLICATIONS

Electrochemical Technology, Vol. 118, No. 2, Feb. 1971, article entitled "The Control of Insoluble Magnesium Compounds Formed During Seawater Battery Discharge" on pps. 394, 395, 396, 397.

*Primary Examiner*—Wendell E. Burns

[57] ABSTRACT

A gas-operated combustion engine for driving a vehicle, the vehicle carrying a hydrogen gas generator including a magnesium electrode immersed in a salt-water electrolyte. The rate of gas evolution in the generator is controlled as a function of demand, the gas being intermixed with air and supplied to the cylinders of the engine.

14 Claims, 1 Drawing Figure

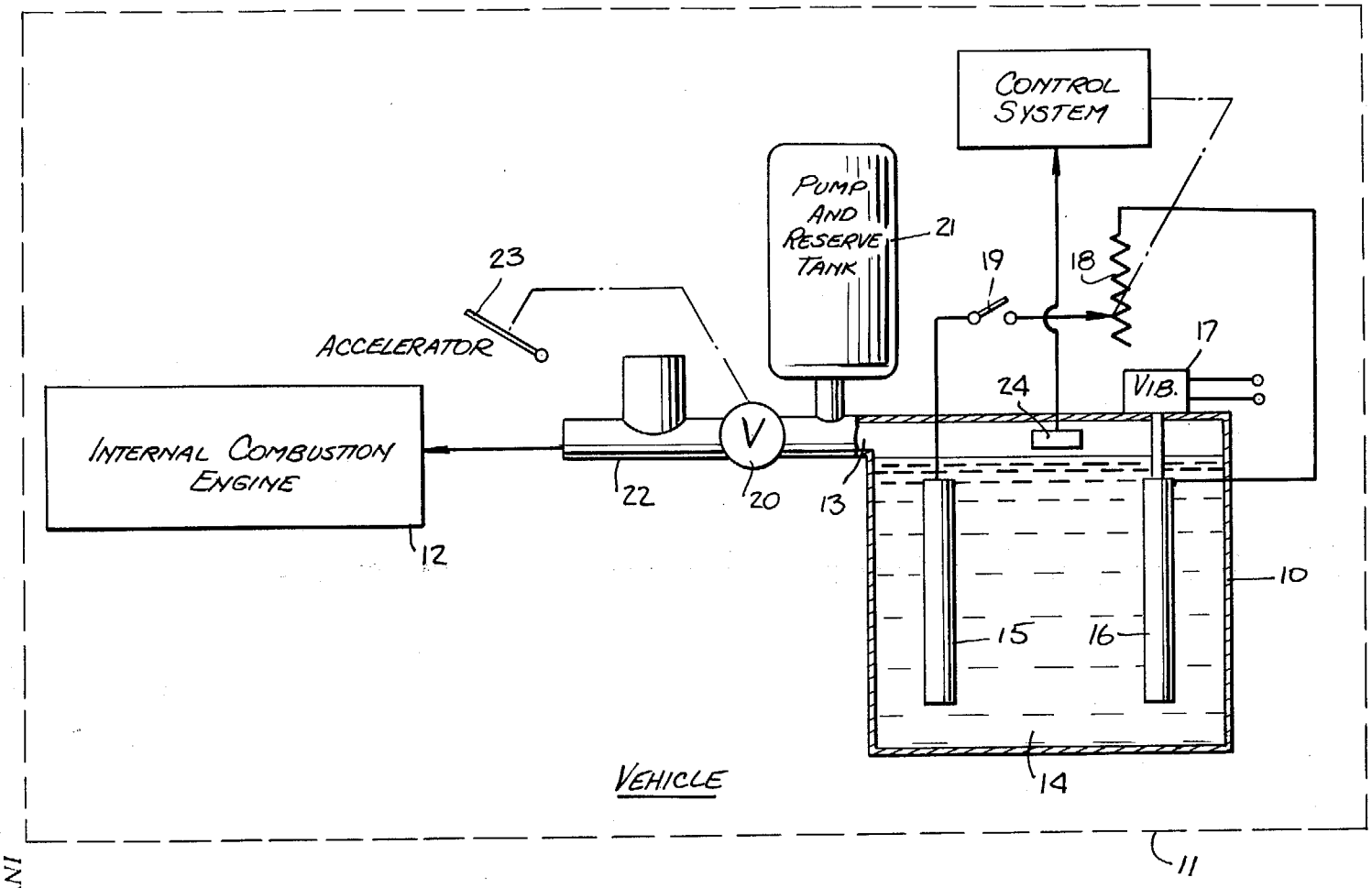
INVENTOR.
FRANCISCO PACHECO
BY
ATTORNEY

GAS-OPERATED INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

This invention relates generally to gas-operated internal-combustion engines, and more particularly to a combined engine and gas-generator assembly wherein the engine is operated by hydrogen gas produced in a generator borne by a vehicle driven by the engine.

In a gasoline-operated internal-combustion engine, the thermal energy which is released when the liquid fuel is burned, is converted into mechanical energy. The engine includes a carburetor wherein gasoline is mixed with air to form a combustible mixture which is compressed in a cylinder and ignited by an electric spark. Gases created in the cylinder by the combustion of the mixture expand and thrust the cylinder piston downwards. The piston imparts a rotary motion to the crankshaft of the engine. The spent gases are removed from the cylinder and replaced by a fresh gas-and-air mixture so that a fresh cycle can begin.

In order to avoid pollution of the atmosphere resulting from the combustion products of gasoline, it is known to operate an internal-combustion engine with propane or other inflammable gases rather than with a liquid fuel. In this instance, the internal-combustion engine is unchanged, except that the carburetor is adjusted to accommodate the use of gas rather than liquid fuel.

The disadvantage of existing gas-operated engines is that the fuel gas is stored in pressurized tanks having a limited capacity. Since gases such as propane have a relatively limited energy content, frequent replacement of the tanks is necessary. Moreover, a tank of highly flammable gas represents a serious hazard, and in the event of an accident an explosion may occur.

OUTLINE OF THE DRAWING

For a better understanding of the invention as well as other objects and further features thereof, reference is made to the following detailed description to be read in conjunction with the accompanying drawing, whose single FIGURE shows an assembly in accordance with the invention.

SUMMARY OF THE INVENTION

In view of the foregoing, it is the primary object of this invention to provide a combined engine and gas-generator assembly wherein hydrogen produced in the generator is utilized as the fuel for the engine.

More particularly, it is an object of the invention to provide an assembly of the above type in which the amount of hydrogen produced is controlled as a function of engine demand, to prevent the excess build-up of gas and to obviate gas hazards.

Also an object of the invention is to provide an assembly in which hydrogen is generated by the interaction of magnesium and a saline solution.

Briefly stated, these objects are attained in a combined engine and gas-generator assembly wherein hydrogen is generated in a tank wherein magnesium and carbon electrodes are immersed in a sea-water bath, the rate of hydrogen generation being controlled by a variable-resistance path connecting the electrodes. The hydrogen evolved in the tank is supplied through an adjustable valve into a carburetor where it is intermixed with air, the mixture being fed into the cylinders of an internal-combustion engine.

DESCRIPTION OF THE INVENTION

According to one embodiment of the invention, a pair of electrodes is suspended in a tank containing highly saturated sea water. Preferably, the electrodes are suspended in sea water concentrated to such extent as to produce supersaturation so that undissolved salt collects at the bottom of the bath.

One electrode is composed of magnesium while the remaining electrode preferably is composed of carbon. The tank is sealed except for a conduit provided for the escape of gas from the container. Means are provided for interconnecting the exposed ends of the electrode through a suitable variable electrical load. In the event that the gas produced is to be utilized as the fuel in the engine of an automotive vehicle, the load may comprise electrical devices such as electric lamps, etc., used in the operation of the vehicle. In any event, the load preferably is in the form of a variable potentiometer under the control of the operator and means are provided for open-circuiting the electrodes.

With the electrodes open-circuited, there is a chemical reaction between the magnesium electrode and the liquid contents of the tank acting very slowly to produce hydrogen gas which is led out through the conduit. Upon closing the circuit between the two electrodes, electric current is caused to flow therebetween dependent upon the magnitude of the load and gas is generated at a higher rate than with the electrodes open-circuited. The rate of production of the hydrogen varies in proportion to the current flow which is inversely proportional to the resistance of the variable potentiometer and may be controlled by the operator.

The reaction is accompanied by the decomposition of the magnesium electrode and the formation of magnesium hydroxide which is deposited in the bottom of the tank and the reaction continues until the magnesium electrode is entirely decomposed, whereupon the magnesium hydroxide is removed and a new magnesium electrode is arranged in the tank and the liquid contents thereof are replenished. The magnesium hydroxide may be processed to recover its magnesium content for further use as desired. Polarization of the carbon electrode by the gas formed in the reaction is prevented by agitation of the carbon electrode through any suitable means for that purpose.

In another embodiment of the invention, powdered magnesium is introduced into a tank containing water highly saturated with sea-water salts. Reaction between the magnesium and the saturated water results in the production of gas at an uncontrolled rate and such gas preferably is stored in an expansible chamber from which it is later withdrawn as desired. However, the reaction may be controlled by means of an automatic magnesium powder or pellet dispenser which discharges magnesium into the tank as a function of hydrogen demand. In this modification, as well as in the other, the reaction yields magnesium hydroxide which as before may be processed to obtain magnesium. After the reaction is completed, the ingredients of the tank are replenished for a further production of the gas. The production of the gas according to this embodiment may be facilitated by the addition of powdered carbon or powdered zinc.

The gas produced according to either of the procedures above described, when mixed with air in the proper proportions, is highly explosive, and when this gas is mixed with air in the proper proportions through a simple valve or jet arrangment and brought to proper compression in a combustion chamber of an engine, it may be ignited by standard ignition means.

In order to appreciate the advantages of the invention, a thermodynamic analysis will now be presented, comparing the hydrogen energy system to the conventional fossil-fuel system utilizing gasoline as the energy source. According to page 1,446 of the 28th edition 1944) of the Handbook of Chemistry and Physics, a mol weight of hydrogen (two grams) provides 104,100 B.t.u.'s (net), or a total of about 23,608,000 B.t.u.'s/lb.

According to the same publication (page 1,446), gasoline provides 20,750 B.t.u.'s/lb. Assuming that an automobile travels a distance of 200 miles and requires 13 gallons of gas (80 pounds), the total thermal output of the gasoline will be 1,660,000 B.t.u.'s. Assuming magnesium is now employed to create the source of energy, the amount of magnesium equivalent to 1,660,000 B.t.u.'s (100-percent conversion efficiency assumed) is determined as follows:

One mol of magnesium (24.3 grams) will react with 2 mols of water to form 1 mol of hydrogen (2 grams) The amount of hydrogen equivalent to 1,660,000 B.t.u.'s is 31.7 grams, which corresponds to about 386 grams of magnesium, or 0.85 pound. Thus, on a thermodynamic basis, a car travelling 200 miles requires 80 pounds (13 gallons) of gasoline (1,660,000 B.t.u.'s), which corresponds to about 0.85 pound of magnesium. The energy cost for gasoline at approximately $0.40 per gallon comes to about $5.20, while the cost for magnesium, at approximately $0.34. Assuming the magnesium-hydrogen system to be only 10 percent efficient, the energy cost would be in the neighborhood of $3.40, which is still less than the cost of conventional fuel, the magnesium-hydrogen system having the added advantage of avoiding air pollution. The actual efficiency of the magnesium-hydrogen system is, of course, much higher than 10 percent, hence the realistic costs of operating a vehicle is much cheaper than with gasoline.

An arrangement for practicing the invention, as shown in the FIGURE, includes a tank 10 borne in a vehicle 11, such as an automobile or truck, which is driven by an internal-combustion engine of standard design, represented by block 12. Tank 10 is preferably formed of non-corrosive metal, and is provided with an insulating liner, the tank including a gas-discharge outlet 13.

The tank is filled with sea-water or a salt solution 14 which is highly saturated to a point at which the water is incapable of dissolving more salt. Supported within tank 10 is a magnesium electrode 15 which is insulated from the metal tank. A second electrode 16, preferably composed of carbon and also insulated from the tank, is supported therein, the second electrode being mounted for agitation through a flexible seal in the wall of the tank by an external vibrator which is energized from the storage battery of the vehicle or from energy derived by galvanic action from the tank electrodes. The purpose of the vibrator is to agitate the carbon electrode to dislodge gas collecting thereon, thereby to prevent polarization of the electrode.

Connected between the electrodes is a potentiometer 18 in series with a switch 19. When switch 19 is open and the electrodes unloaded, gas is generated very slowly and is discharged through outlet 13 leading to a valve 20. Assuming that the valve is closed, hydrogen will collect in a reserve tank 21. The purpose of reserve tank 21 is to collect a small supply of hydrogen gas for starting purposes, before an adequate gas build-up occurs when closing the switch prior to driving the vehicle.

When switch 19 is closed, gas is electrolytically generated at a rate which depends on the load resistance introduced by potentiometer 18. In practice, potentiometer 18 is adjusted to a level sufficient to supply no more hydrogen than is necessary to operate the engine, thereby avoiding an excessive build-up of gas that might lead to a hazardous condition. The adjustment of the potentiometer may be manual, or it may be automatically controlled in response to a pressure sensor 24 disposed in the tank to regulate the amount of gas generated as a function of demand, as reflected by the pressure within the tank.

Hydrogen from outlet 13 is fed through valve 20 into a carburetor 22, where it is intermixed with air in an appropriate ratio, such as 1-to-7, the explosive mixture then being fed into the cylinders of engine 12. The vehicle accelerator 23 is operatively linked to valve 20 to vary the amount of hydrogen fed into the carburetor, thereby to control vehicle speed.

While there have been shown and described preferred embodiments of a gas-operated internal-combustion engine in accordance with the invention, it will be appreciated that many changes and modifications may be made therein without, however, departing from the essential spirit of the invention.

For example, though the system has been described in conjunction with an internal-combustion engine, it is usable for fueling any type of burner or engine capable of consuming hydrogen in place of the existing fuel. Also, in place of carbon electrodes, the tank itself may be fabricated of carbon or provided with an inner liner of carbon.

Another way of controlling the amount of gas generated is by adjusting the degree of immersion of the magnesium electrode in the electrolyte, thereby varying the effective electrode surface. Also, in lieu of a single magnesium electrode, one may provide a bank of magnesium plates, thereby greatly augmenting the area of activity and the rate of gas production.

The magnesium electrodes are preferably in alloy form, the alloy being such as to inhibit polarization of the electrode. For this purpose, an alloy consisting essentially of 93 percent magnesium and 7 percent zinc, by weight, has been found suitable. It is also possible to alloy magnesium with iron to minimize polarization effects.

In practice, reserve tank 21 may be combined with a compressor to provide an adequate supply of fuel to improve acceleration of the engine. In lieu of salt water, one may use other ionizable compounds to provide a magnesium-corrodable aqueous electrolyte. It is intended therefore in the annexed claims to encompass all such changes and modifications.

I claim:

1. A gas-operated internal-combustion engine adapted to drive a vehicle and having a carburetor, comprising:

A. a gas generator mounted on said vehicle, said generator including a tank having a salt-water electrolyte and a magnesium electrode suspended in said electrolyte to cause hydrogen to evolve in the tank, B. adjustable means coupled to said generator to vary the rate at which hydrogen is evolved in said tank, C. means to feed hydrogen from said tank into said carburetor to intermix with air to produce a combustible mixture, D. means to supply said mixture to the cylinders of said engine, E. means to sense the amount of hydrogen consumed by the engine to produce a control signal as a function thereof, and F. means responsive to said control signal to operate said adjustable means whereby the amount of hydrogen evolved is not substantially in excess of that required by the engine.

2. An engine as set forth in claim 1, wherein said tank also has a carbon electrode immersed in the water, and said means to vary the rate at which hydrogen is evolved comprises a variable resistance connected between the magnesium and carbon electrodes.

3. An engine as set forth in claim 1, further including a reserve gas tank coupled to the outlet of the gas generator to accumulate a supply of hydrogen for starting purposes.

4. An engine as set forth in claim 1, further including a valve interposed between the generator and carburetor, and means operatively coupling the valve to the accelerator pedal of the vehicle.

5. An engine as set forth in claim 1, wherein said salt solution is highly saturated.

6. An engine as set forth in claim 1, wherein said salt solution is sea water.

*7. A gas generator for producing hydrogen usable as a fuel for an engine whose demand is variable and for similar purposes, said generator comprising:*

*A. a tank having a salt water electrolyte therein;*

*B. a pair of electrodes disposed in said electrolyte, one of said electrodes being formed primarily of magnesium; and*

*C. an electrical circuit forming a conductive path between said electrodes to produce a current flow in said path causing hydrogen to be evolved in said tank, said circuit including a variable resistor external to the tank which is adjustable to set the rate at which hydrogen is evolved to satisfy the demand therefor.*

*8. A gas generator as set forth in claim 7, wherein said salt water is constituted by sea water.*

*9. A gas generator as set forth in claim 7, wherein the other electrode is formed primarily of carbon.*

*10. A gas generator as set forth in claim 7, further including means to depolarize said other electrode.*

*11. A gas generator as set forth in claim 10, wherein said depolarizer means is constituted by a vibrator operatively coupled to said other electrode.*

*12. A gas generator as set forth in claim 11, wherein said vibrator is electrically-energized by power derived from said electrical circuit.*

*13. A gas generator as set forth in claim 7, further including means automatically to adjust the value of said resistor as a function of said engine fuel demand.*

*14. A gas generator as set forth in claim 7, wherein said one of said electrodes is an alloy of magnesium and a metal selected from the class consisting of zinc and iron to produce a composition minimizing polarization effects.*

* * * * *